(12) United States Patent
Yang (10) Patent No.: US 8,407,346 B2
(45) Date of Patent: Mar. 26, 2013

(54) SERVICE FACADE DESIGN AND IMPLEMENTATION

(75) Inventor: Li Yang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 190 days.

(21) Appl. No.: 12/271,658

(22) Filed: Nov. 14, 2008

(65) Prior Publication Data

US 2010/0125666 A1 May 20, 2010

(51) Int. Cl.
*G06F 15/173* (2006.01)
*G06F 7/04* (2006.01)
(52) U.S. Cl. ............................ 709/225; 709/226; 726/10
(58) Field of Classification Search .................. 709/225; 726/10
See application file for complete search history.

(56) References Cited

U.S. PATENT DOCUMENTS

| | | | |
|---|---|---|---|
| 6,438,594 B1 | 8/2002 | Bowman-Amuah | |
| 7,127,502 B1 * | 10/2006 | Nishikado et al. | 709/219 |
| 7,809,813 B2 * | 10/2010 | Ma et al. | 709/223 |
| 2002/0046228 A1 * | 4/2002 | Scheifler et al. | 709/1 |
| 2002/0087714 A1 * | 7/2002 | Connor | 709/235 |
| 2002/0120685 A1 * | 8/2002 | Srivastava et al. | 709/203 |
| 2005/0010816 A1 * | 1/2005 | Yu et al. | 713/201 |
| 2005/0044197 A1 | 2/2005 | Lai | |
| 2005/0144277 A1 * | 6/2005 | Flurry et al. | 709/225 |
| 2006/0212836 A1 * | 9/2006 | Khushraj et al. | 715/866 |
| 2007/0011126 A1 | 1/2007 | Conner | |
| 2008/0140857 A1 | 6/2008 | Conner | |
| 2008/0244078 A1 * | 10/2008 | Viljoen et al. | 709/229 |
| 2010/0107222 A1 * | 4/2010 | Glasser | 726/3 |

OTHER PUBLICATIONS

Chakraborty et al., "DReggie: Semantic Service Discovery for M-Commerce Applications", 2001, Workshop on Reliable and Secure Applications in Mobile Environment, 20th Symposiom on Reliable Distributed Systems, p. 1-6.*
C. Lee and S. Helal. Protocols for Service Discovery in Dynamic and Mobile Networks. International Journal of Computer Research, 11(1):1-12, 2002.*
Fikouras et al., "Service Discovery and Orchestration for Distributed Service Repositories", 2003, Service-Oriented Computing—ICSOC 2003 Lecture Notes in Computer Science vol. 2910, p. 59-74.*
Stevens, Michael "Service-Oriented Architecture Introduction, Part 2", Retrieved Sep. 4, 2008, from Developer.com website: http://www.developer.com/tech/article.php/1014371.

(Continued)

*Primary Examiner* — Lynn Feild
*Assistant Examiner* — Taylor Elfervig
(74) *Attorney, Agent, or Firm* — Workman Nydegger (57) ABSTRACT

In one embodiment, a computer system receives registration information for available services provided by a service provider. The registration information includes information identifying functionality provided by the available services, and the registration information is used to register the available services with the intermediary service. The computer system receives a service request from a client computer system identifying a function that is to be performed by at least one of the available services registered at the intermediary service. The computer system determines which of the registered available services is configured to provide the functionality requested by the client and processes the received service request using various system functionality components, so that the service request is configured for service-specific processing provided by a registered available service. The computer system also sends the processed service request to the registered service determined to be configured to provide the functionality requested by the client.

20 Claims, 4 Drawing Sheets

OTHER PUBLICATIONS

Mainsoft Ports a Composite Application Platform to Java EE While Maintaining Original .NET Performance, May 2007, pp. 1-8.

Wilkes, Lawrence and Richard Veryard, "Service-Oriented Architecture: Considerations for Agile Systems", Apr. 2004, website: http://msdn.microsoft.com/en-us/arcjournal/aa480028(printer).aspx.

"Implementing Interoperability Design Elements", Microsoft Corporation, Dec. 2003, website: http://msdn.microsoft.com/en-us/library/ms998418(printer)aspx.

"Service Gateway", Microsoft Corporation, Retrieved Sep. 4, 2008, from website: http://msdn.microsoft.com/en-us/library/ms998420(printer).aspx.

Murthy, Lakshmi "Service Oriented Architecture—Part 1", Aug. 23, 2004, website: http:techsavygal.blogspot.com/2004/08/service-oriented-architecture-part-1.html.

\* cited by examiner

SERVICE FACADE DESIGN AND IMPLEMENTATION

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, a client computer system might connect to a server in a datacenter to access a service. The service could provide simple or very complex functionality, and may be able to communicate with other services in the process. Such services are often referred to as software as a service or SAAS.

Datacenters configured to provide services often provide many generalized system services in addition to more specific business-oriented services. Providing these generalized services in addition to the business-specific services often leads to inefficiencies system-wide.

BRIEF SUMMARY

Embodiments described herein are directed to providing an intermediary service configured to provide system functionality processing on received service requests and to determine which registered services are to be used to process the requests. In one embodiment, a computer system receives registration information for available services provided by a service provider. The registration information includes information identifying functionality provided by the available services, and the registration information is used to register the available services with the intermediary service. The computer system receives a service request from a client computer system identifying a function that is to be performed by at least one of the available services registered at the intermediary service. The computer system determines which of the registered available services is configured to provide the functionality requested by the client and processes the received service request using various system functionality components, so that the service request is configured for service-specific processing provided by a registered available service. The computer system also sends the processed service request to the registered service determined to be configured to provide the functionality requested by the client.

In another embodiment, a computer system sends a service registration request to a business facade service. The service registration request includes a description of the functionality provided by the service and an indication of how to access the service. The computer system receives a processed user request for the service determined to be configured to provide user-requested functionality, where the user request has been processed such that only service-specific functionality is to be provided, the generic system functionality having been provided by the business facade service. The computer system processes the user request using the functionality provided by the service and sends the results of the processed user request to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to providing an intermediary service configured to provide system functionality processing on received service requests and to determine which registered services are to be used to process the requests. In one embodiment, a computer system receives registration information for available services provided by a service provider. The registration information includes information identifying functionality provided by the available services, and the registration information is used to register the available services with the intermediary service. The computer system receives a service request from a client computer system identifying a function that is to be performed by at least one of the available services registered at the intermediary service. The computer system determines which of the registered available services is configured to provide the functionality requested by the client and processes the received service request using various system functionality components, so that the service request is configured for service-specific processing provided by a registered available service. The computer system also sends the processed service request to the registered service determined to be configured to provide the functionality requested by the client.

In another embodiment, a computer system sends a service registration request to a business facade service. The service registration request includes a description of the functionality provided by the service and an indication of how to access the service. The computer system receives a processed user request for the service determined to be configured to provide user-requested functionality, where the user request has been processed such that only service-specific functionality is to be provided, the generic system functionality having been provided by the business facade service. The computer system processes the user request using the functionality provided by the service and sends the results of the processed user request to the user.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
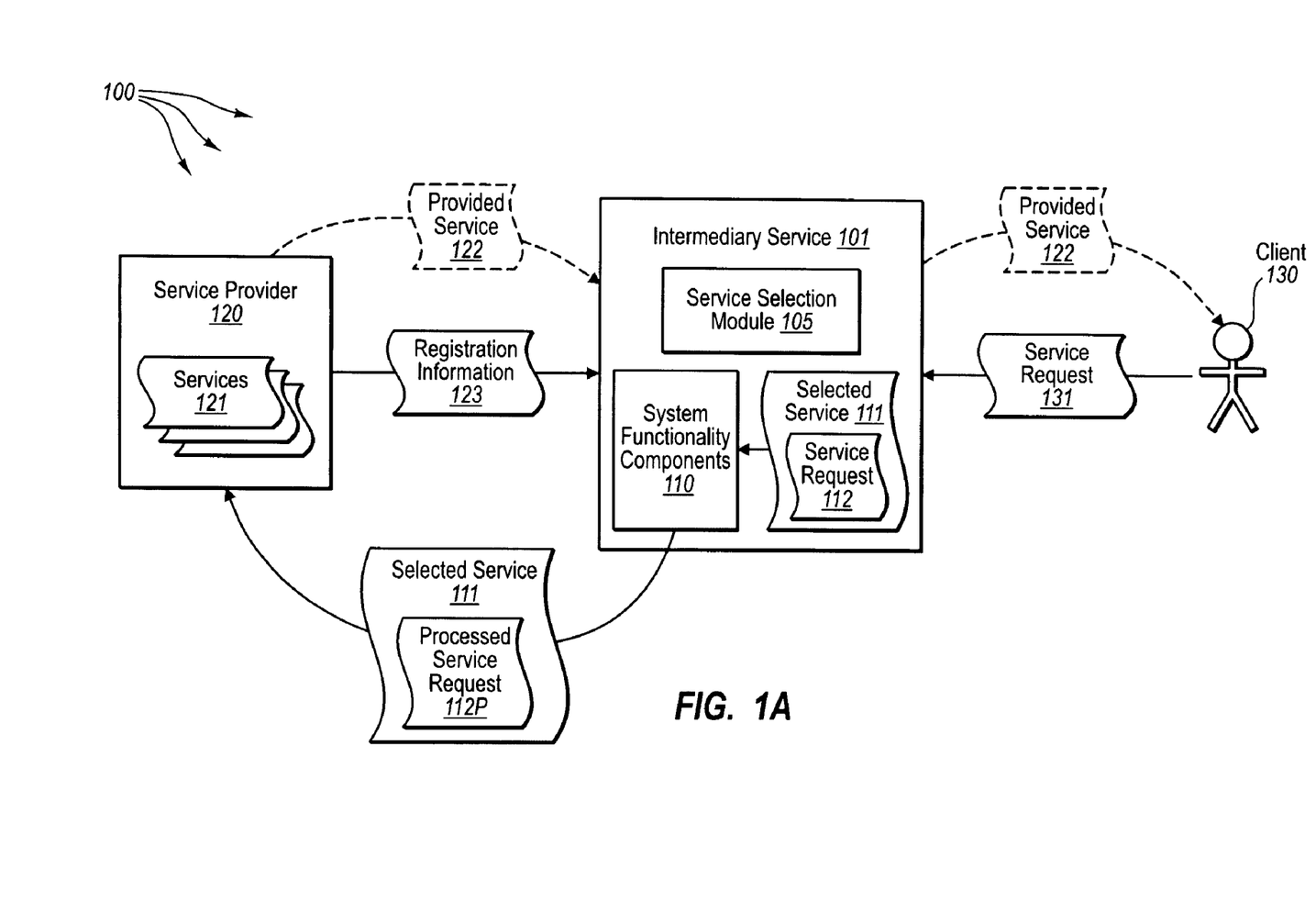
FIGS. 1A & 1B illustrate a computer architecture in which embodiments of the present invention may operate including providing an intermediary service configured to provide system functionality processing on received service requests and to determine which registered services are to be used to process the requests.
Figure 1B:
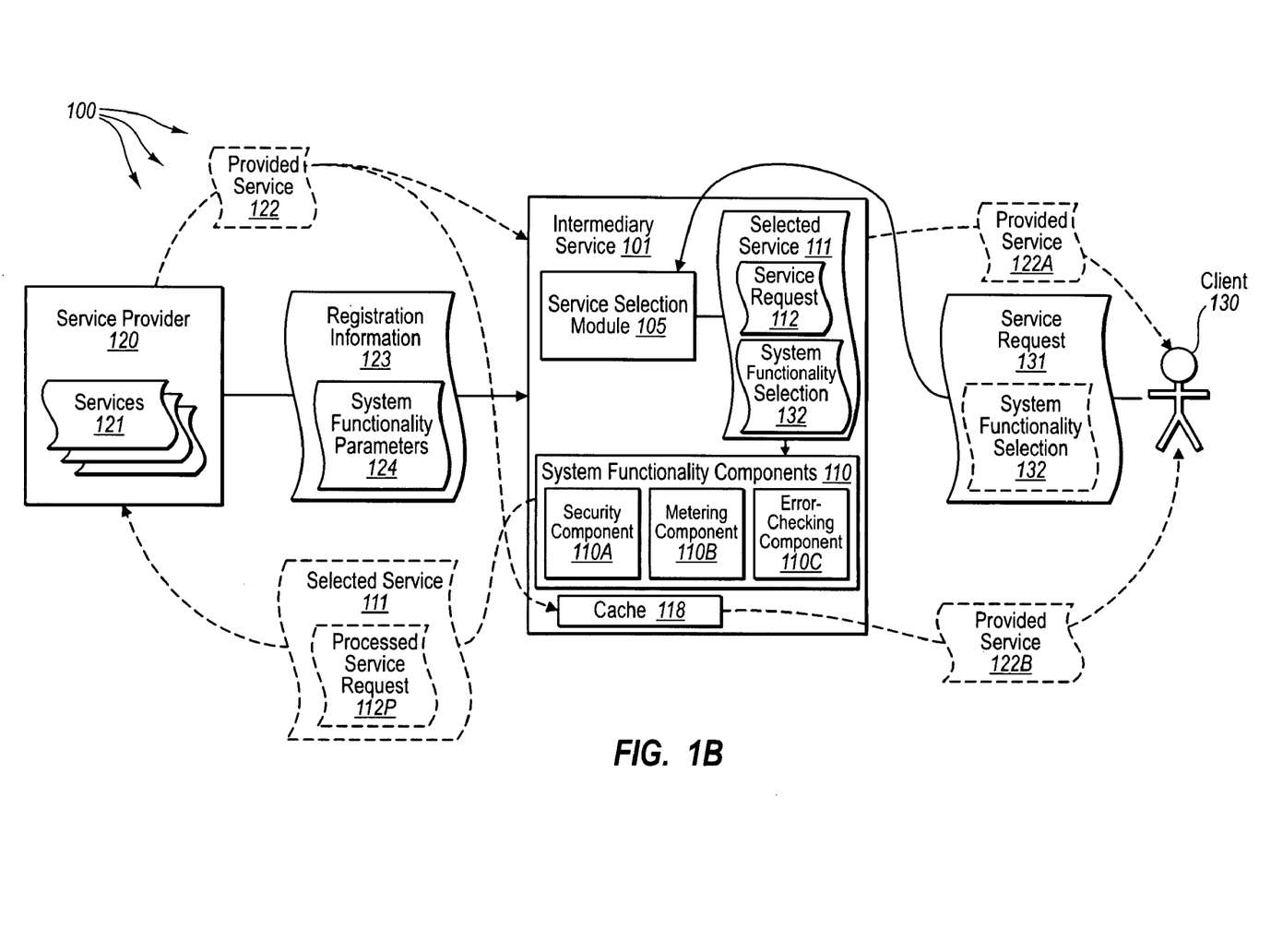

FIGS. 1A and 1B illustrate computer architectures 100A and 100B in which the principles of the present invention may be employed. Computer architectures 100A and 100B may include many of the same elements or different elements. In general, elements with like numbers are the same or substantially similar. Each architecture may be implemented in the same or different computer systems. As used herein, reference numbers may refer to either or both of architectures 100A and 100B, and embodiments referring to elements in one architecture may also function similarly or in a different manner in another architecture.

Computer architecture 100A includes intermediary service 101. Intermediary service may include any type of computer service including a network-provided service, a software application, a software method or function, or any other software code portion configured to provide functionality to a user or other computer system. In some cases, intermediary service 101 may be an intermediary in that it sits or is positioned between client 130 and service provider 120. As used herein, service provider 120 may be any type of computer user, business entity, computer system or other entity capable of providing services (e.g. services 121). As mentioned above, services 121 may include any type of computer program or software code portion configured to provide some type of functionality to a computer user (e.g. client 130) or other computer system(s). In some cases, service provider 120 may be a business that provides web services that offer various types of functionality to internet users, such as client 130.

For example, service provider 120 may provide an email service that allows client 130 to login to the service and access their personal or business email. In such cases, intermediary service 101 may be positioned to intercept service request 131 that would otherwise be sent directly to service provider 120. Intermediary service 101 may be configured to provide functionality that was either not offered by service provider 120 or that, if provided by provider 120, causes a processing and resource burden on the provider. Thus, intermediary service 101 may alleviate some (or all) of the provider's burden by performing such functionality before the provider receives the service request 131. For example, intermediary service 101 may include various system functionality components 110 that provide general, system-level processing features such as security, error-checking and metering. Many other functions are possible, as will be explained in greater detail below. Intermediary service 101 may also allow service provider 120 to register services 121 (e.g. using registration information 123) to keep service 101 apprised of which services are currently being provided by provider 120.

Intermediary service 101 may also be configured to provide service selection functionality for the user. For instance, user 130 may be able to simply indicate the type of functionality they want to use (or in some manner indicate what it is they want a particular service to perform). Thus, in one example, a user may indicate that he or she wants to store a file in an online storage service. Service selection module 105 of intermediary service 101 may be able to determine, based on the user's indication, which of services 121 provided by provider 120 is suitable to store the user's file. Service selection module 105 may also be configured to send an indication of which service or services are suitable for performing such an action in selected service indication 111. Indication 111 may also include service request 131 received from user 130. System functionality components 110 may process the request (e.g. perform security, error checking, etc.) and send processed service request 112P (along with selected service indication 111) to service provider 120. Service provider 120 may then provide the service 122 to user 130 via intermediary service 101.

Computer architecture 100B includes many of the same components identified in architecture 100A. Many different components are also included for use in various scenarios. These different elements may be used in addition to or as an alternative to the elements of architecture 100A. For example, in one embodiment, a cache 118 may be included in intermediary service 101. As will be explained in greater detail below, intermediary service 101 may be configured to determine that service request 131 (or a service request substantially similar to request 131) has already been processed by service provider, the results of which having been stored in cache 118. Intermediary service 101 may determine that all or a portion of the service requested in request 131 may be satisfied using information stored in cache 118. Thus, provided service 122B may be provided by intermediary service 101. This and other embodiments will be explained in greater detail below with regard to methods 200 and 300 of FIGS. 2 & 3, respectively.

Figure 2:
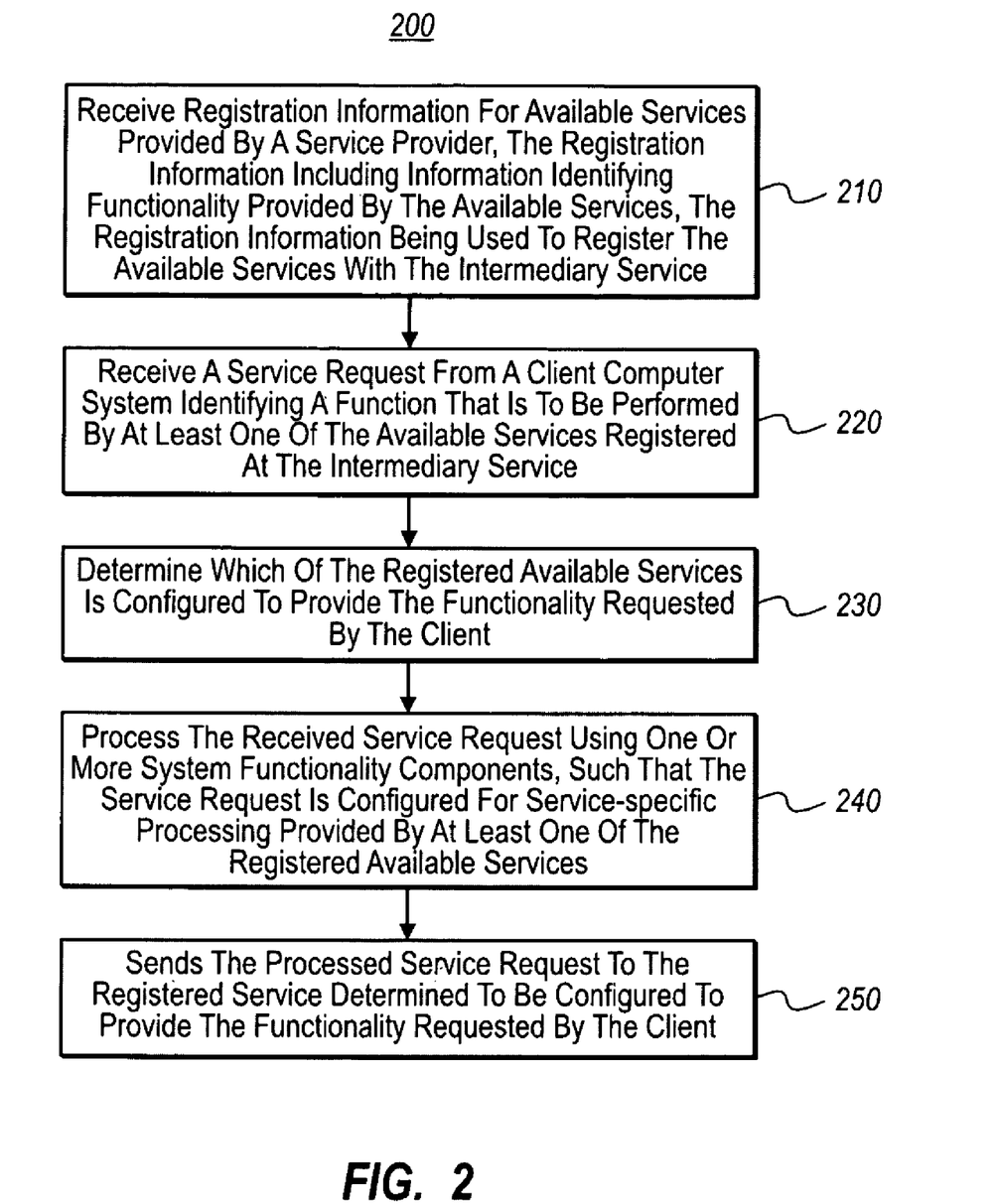
FIG. 2 illustrates a flowchart of an example method for providing an intermediary service configured to provide system functionality processing on received service requests and to determine which registered services are to be used to process the requests.

FIG. 2 illustrates a flowchart of a method 200 for providing an intermediary service configured to provide system functionality processing on received service requests and to determine which registered services are to be used to process the requests. The method 200 will now be described with frequent reference to the components and data of environments 100A and/or 100B.

Method 200 includes an act of an intermediary service receiving registration information for one or more available services provided by a service provider, the registration information including information identifying functionality provided by the available services, the registration information being used to register the available services with the intermediary service (act 210). For example, intermediary service 101 may receive registration information 123 for available services 121 provided by service provider 120. Registration information 123 may include information identifying functionality provided by each of available services 121. Moreover, registration information 123 may be used to register the available services with intermediary service 101, thus apprising service 101 of which functionality is available and through which services the functionality may be obtained. In this manner, services may be registered and unregistered on a regular basis, ensuring that intermediary service 101 is up to date.

As indicated above, intermediary service 101 may be configured to provide some functionality on its own. In some cases, this functionality may include general, system functionality that is at least somewhat generic and is to be applied to a large portion of the request. For example, many requests are scanned for errors or authenticated or metered in some fashion. This allows service provider 120 to provide business-specific services that are unique to the business. Thus, generalized functionality may be offloaded to the intermediary service, while the specific functionality is provided by the services 121.

In some cases, service provider 120 may specify which system functionality is to be provided by the intermediary service. For instance, provider 120 may indicate that intermediary service 101 is to implement security component 110A to authenticate client 130 and verify that client 130 has rights to access one or more of services 121. Additionally or alternatively, provider 120 may indicate that user 130's access to services 121 is to be metered (e.g. by metering component 110B), and that, for example, if client 130 has already accessed a particular service more than some threshold value, the user will be denied access until a certain amount of time has passed. Such metering or other parameters may be sent to intermediary service 101 as system functionality parameters 124 and may be sent with registration information 123. Moreover, provider 120 may indicate that error-checking component 110C is to be implemented to check service request 131 for various errors before the request is forwarded to the provider. Many other types of functionality may be provided by the intermediary service 101, and new types of functionality may be specified in registration information 123.

Method 200 includes an act of the intermediary service receiving a service request from a client computer system identifying a function that is to be performed by at least one of the available services registered at the intermediary service (act 220). For example, intermediary service 101 may receive service request 131 from client 130 (or from client 130's computer system) identifying a function that is to be performed by one of available services 121 registered at intermediary service 101. The identified function may be any type of function that can be provided by a service. For instance, user 130 may request email or storage services, shopping cart or music services, video games or chat services, or any other type of service. Intermediary service 101 may store (e.g. in cache 118) a list of registered services 121 including an identification of which type of service each registered service provides (this information may be stored in web services description language (WSDL) for example). Intermediary service 101 may refer to such a list when determining which service provider 120 should provide to client 130.

Method 200 includes an act of the intermediary service determining which of the one or more registered available services is configured to provide the functionality requested by the client (act 230). For example, as explained above, service selection module 105 of intermediary service 101 may determine which of registered available services 121 is configured to provide the functionality requested in request 131. Service selection module 105 may refer to a stored list of available, registered services in making the determination.

Method 200 also includes an act of the intermediary service processing the received service request using one or more system functionality components, such that the service request is configured for service-specific processing provided by at least one of the registered available services (act 240). For example, intermediary service 101 may process service request 131 using various system functionality components 110. The service request may be configured for service-specific processing provided by one or more of registered available services 121.

As mentioned above, the system functionality provided by system functionality components 110 may include performing one or more security-related functions on the client request. For example, security component 110A may be configured to authenticate user 130 to intermediary service 101 and/or to service provider 120. In some cases, user 130 may be authenticated to intermediary service 101 using authentication certificates (e.g. Kerberos, x509, etc.). The authentication may include verifying that client 130 is authorized to access the registered service 121 provided by service provider 120. Additionally or alternatively, the registered service itself may specify (e.g. in registration information 123) which type of authentication should be used to authenticate the user to the intermediary service and/or to the service provider or to the service itself. Another security-related function may include validating the client computing system (i.e. user 130) using an authenticated token associated with a unique identifier unique to the client computing system. In this manner, intermediary service 101 can verify that the client's computing system is a computing system that is among those allowed to access a given service. In some cases, intermediary service 101 may redirect the service request to a third party security service for verifying that client 130 has rights to access the registered service.

System functionality may also include performing client request metering based on one or more metering parameters (e.g. system functionality parameters 124). A client's request may be allowed or denied based on a metering determination. For example, metering component 110B may keep track of how many times a given user has accessed a given service. Service provider 120 may wish to be apprised of this information and make decisions based on how many times or how often a given service is being accessed. Service provider 120 may define rules or other parameters that are to be used when accessing services 121. Such a rule may state, for example, that user 130 is allowed to access Service A on a daily basis, Service B on a weekly basis, Service C on a per-byte bandwidth use basis, Service D on an unlimited basis, and so on. Any combination of the above, or different metering scheme altogether may be applied to a given service or group of services, and may apply to a given user, group of users, computing system or group of computing systems. In some cases, a client's request may be given a higher or lower processing priority order based on the identification of the client that sent the request. For example, some users, such as company executives, may have higher processing priority than other users. As mentioned previously, each parameter of any of the system functionality components 110 may be individually set and applied to or for various entities.

In some embodiments, intermediary service 101 may perform load balancing such that request 131 is sent to an appropriate registered service based on at least one of the registered services' service record, current availability of resources, request priority, quality of service (QoS) indications, time of day or any other factor that may be used as a basis for determining which service or computer system is currently the most adequately equipped to process the request. System functionality may also include performing client request error handling. For example, error-checking component 110C may check request 131 to verify that the request does not contain errors. Those requests that include errors are returned to the client to be resolved before submission to the registered service.

Method 200 also includes an act of the intermediary service sending the processed service request to the registered service determined to be configured to provide the functionality requested by the client (act 250). For example, intermediary service 101 may send processed service request 112P to the registered service 121 determined to be configured to provide the functionality requested by client 130. Upon receiving selected service 111 and processed service request 112P, service provider 120 can indirectly provide the identified service 122A to client 130 via intermediary service 101. As indicated above, in some cases, intermediary service 101 may cache service-specific data for a registered service received from the registered service in response client request 131, or in response to a prior request. Upon receiving a subsequent client request directed toward the same (or substantially the same) registered service, the intermediary service may send the cached service-specific data to the client, such that the registered service does not receive the client request. In this manner, resources are conserved since the client's request is handled entirely by intermediary service 101 and service provider 120 does not have to expend any resources processing the client's request.

Figure 3:
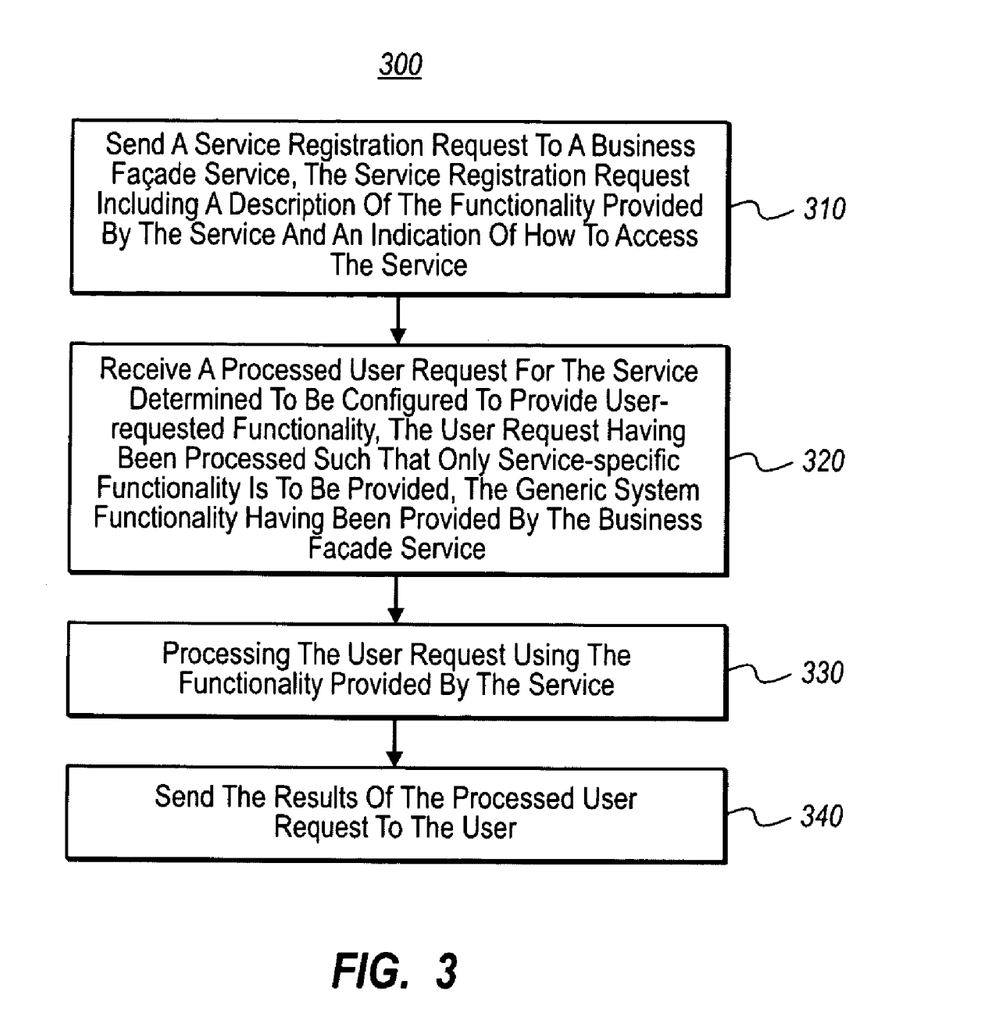
FIG. 3 illustrates a flowchart of an example method for interfacing with a business facade service configured to provide system functionality processing on received service requests and to determine which registered services are to be used to process such service requests.

FIG. 3 illustrates a flowchart of a method 300 for interfacing with a business facade service configured to provide system functionality processing on received service requests and to determine which registered services are to be used to process such service requests. The method 300 will now be described with frequent reference to the components and data of environment 100.

Method 300 includes an act of sending a service registration request to a business facade service, the service registration request including a description of the functionality provided by the service and an indication of how to access the service (act 310). For example, service provider 120 may send registration information 123 to business facade service 101 (which, at least in some embodiments, is the same as intermediary service 101). Information 123 may include a description of the functionality provided by one or more of services 121 and an indication of how to access the service. For instance, registration information 123 may include a list of various services and the type of functionality provided by each. Moreover, the information may include various parameters or accessing means informing the use on how to access each of the services.

In some cases, services 121 are provided by a third party service provider. In such cases, either provider 120 or the third party provider(s) may provide registration information indentifying those services that are provided by the third party provider. In some embodiments, the third party service provider may have its own business facade service configured to provide intermediary processing for a plurality of other services provided by the third party service provider.

As mentioned above, service provider 120 may provide an indication of which security measures are to be implemented (e.g. in system functionality parameters 124) between the user and the business facade service to ensure that the user is authorized to access the available service(s). Metering, error-checking or other system functionality parameters may also be indicated. Additionally or alternatively, desired system functionality may be specified by user 130 in system functionality selection 132. In this manner, user 130 may determine which types of system functionality are to be performed by business facade service 101, and may further specify parameters for how the system functionality is to be performed.

Method 300 includes an act of receiving a processed user request for the service determined to be configured to provide user-requested functionality, the user request having been processed such that only service-specific functionality is to be provided, the generic system functionality having been provided by the business facade service (act 320). For example, service provider 120 may receive processed service request 112P indicating the service determined to be configured to provide user-requested functionality (requested in 131), where request 131 was processed such that only service-specific functionality is to be provided by service(s) 121 because the generic, system functionality was provided by business facade service 101.

Method 300 also includes an act of processing the user request using the functionality provided by the service (act 330). For example, service provider 120 may process request 112P using service(s) 121, as indicated by selected service indication 111. Thus, the appropriate service from registered available services 121 may be used to process user request 112P. Because the pre-processing has been performed by business facade service 101, service provider 120 does not need to perform the system functionality that it would otherwise need to perform.

Method 300 includes an act of sending the results of the processed user request to the user (act 340). For example, service provider 120 may send provided service 122A and/or the results of the processed user request 112P to intermediary service 101, which sends service 122A to user 130. As explained above, service provider 120 may additionally send the processed results to cache 118, where the results may then be later disseminated to other users based on their similar requests.

Accordingly, a user may specify a type of functionality that that is to be provided by a service. An intermediary service may intercept the user's request, perform system functionality processing on the message, and pass the message on to the service provider. The service provider may then provide the desired service, based on the user's indication of desired functionality.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. At a computer system including a processor and a memory, in a computer networking environment including a plurality of computing systems, a method for providing an intermediary service configured to provide system functionality processing on received service requests and to determine which registered services are to be used to process the requests, the method comprising:

an act of an intermediary service receiving registration information for one or more available services provided by a plurality of service providers, the registration information including information identifying various types of functionality provided by each of the service providers' available services, the registration information being used to register the available services with the intermediary service;

an act of the intermediary service intercepting a service request from a client computer system identifying a type of functionality that is to be performed by at least one of the available services provided by the plurality of service providers that are registered at the intermediary service, the service request further including rules indicating how the identified type of functionality is to be performed and further specifying one or more groups of users or computer systems to which the rules apply;

an act of the intermediary service determining which of the one or more registered available services is configured to provide the type of functionality requested by the client, wherein each of the service providers' registered services is configured to provide service-specific settings for one or more generalized services that are to be performed by the intermediary service, the service-specific settings corresponding to the specified rules;

an act of the intermediary service sending the processed service request to the service provider whose service is determined to provide the type of functionality requested by the client, such that the determined service provider sends the requested service to the intermediary service to provide the functionality requested by the client, wherein upon sending the requested service to the intermediary service, the determined service provider further includes an indication of one or more generalized services that are to be provided by the intermediary service in addition to the identified service determined to be configured to provide the type of functionality requested by the client, wherein the identified service specifies one or more specific settings indicating how at least one of the generalized services provided by the intermediary service is to be performed;

upon the intermediary service receiving the requested service from the determined service provider, an act of the intermediary service performing the one or more indicated generalized services on the service according to the settings specified by the determined service provider for that generalized service; and an act of the intermediary service providing to the client computer system the requested service which includes both the determined service provider's service as well as the one or more indicated generalized services provided by the intermediary service provider.

2. The method of claim 1, wherein the service provider specifies which system functionality is to be provided by the intermediary service.

3. The method of claim 1, wherein the system functionality comprises performing one or more security-related functions on the client request.

4. The method of claim 3, wherein at least one of the security-related functions comprises authenticating the user to the intermediary service.

5. The method of claim 4, wherein the user is authenticated to the intermediary service using authentication certificates, the authentication including verifying that the client is authorized to access the registered service provided by the service provider.

6. The method of claim 3, wherein the registered service specifies which type of authentication should be used to authenticate the user to the intermediary service.

7. The method of claim 3, wherein at least one of the security-related functions comprises validating the client computing system using an authenticated token associated with a unique identifier unique to the client computing system.

8. The method of claim 3, wherein the intermediary service redirects the service request to a third party security service for verifying that the client has rights to access the registered service.

9. The method of claim 1, wherein the system functionality comprises performing client request metering based on one or more metering parameters.

10. The method of claim 9, wherein the client's request is given a higher or lower processing priority order based on the identification of the client that sent the request.

11. The method of claim 1, wherein the intermediary service performs load balancing such that the request is sent to an appropriate registered service based on at least one of the registered services' service record, current availability of resources, request priority, quality of service (QoS) indications and time of day.

12. The method of claim 1, wherein the system functionality comprises performing client request error handling, such that client requests that include errors are returned to the client to be resolved before submission to the registered service.

13. The method of claim 1, further comprising an act of the intermediary service storing one or more descriptions of available services registered with the intermediary service.

14. The method of claim 1, further comprising:
an act of the intermediary service caching service-specific data for a registered service received from the registered service in response to a prior client request;
an act of the intermediary service receiving a subsequent client request directed toward the same registered service; and
an act of the intermediary service sending the cached service-specific data to the client such that the registered service does not receive the client request.

15. A computer program product for implementing a method for interfacing with a business façade service configured to provide system functionality processing on received service requests and to determine which registered services are to be used to process such service requests, the computer program product comprising a computer-readable storage device having stored thereon computer-executable instructions that, when executed by one or more processors of the computing system, cause the computing system to perform the method, the method comprising:
an act of sending a service registration request to a business façade service, the service registration request including a description of the functionality provided by the service and an indication of how to access the service, each service registration request for each of the services provided by a plurality of different service providers including an indication of those generalized services that are to be provided by the business service façade in addition to the registered service and further providing one or more specific settings indicating how at least one of the generalized services provided by the business façade service is to be performed;
an act of receiving a processed user request for one or more services determined to be configured to provide one or more types of user-requested functionality, the user request having been processed such that only service-specific functionality is to be provided, the indicated generic system functionality having been provided by the business façade service according to the settings specified by each service provider for the service providers' registered service for that generalized service, the processed user request further including rules indicating how the identified type of user-requested functionality is to be performed and further specifying one or more groups of users or computer systems to which the rules apply;
an act of processing the user request using the functionality provided by the registered service; and
an act of sending the results of the processed user request to the user, wherein the processed user request includes both the registered service that is configured to provide the type of functionality requested by the client, as well as the one or more indicated generalized services provided by the business façade service.

16. The method of claim 15, wherein the service is provided by a third party service provider.

17. The method of claim 16, wherein the third party service provider has at least one business façade service configured to provide intermediary processing for a plurality of other services provided by the third party service provider.

18. The method of claim 15, further comprising an act of the service provider providing one or more metering parameters to the business façade service.

19. The method of claim 15, further comprising an act of the service provider providing an indication of which security measures are to be implemented between the user and the business façade service to ensure that the user is authorized to access the service.

20. A computer system comprising the following:
one or more processors;
system memory;
one or more computer-readable storage media having stored thereon computer-executable instructions that, when executed by the one or more processors, causes the computing system to perform a method for providing a business façade service configured to provide system functionality processing on received service requests and to determine which registered services are to be used to process the requests, the method comprising the following:
an act of a business façade service receiving registration information for one or more available business-specific services provided by a plurality of service providers, the registration information including information identifying various types of business functionality provided by each of the service providers' available business-specific services, the registration information being used to register the available services with the business façade service;
an act of the business façade service intercepting a service request from a business service end user identifying a type of functionality that is to be performed by at least one of the available business-specific services provided by the plurality of service providers that are registered at the business façade service, the service request further including rules indicating how the identified type of functionality is to be performed and further specifying one or more groups of users or computer systems to which the rules apply;
an act of the business façade service determining which of the one or more registered available business-specific services is configured to provide the type of functionality requested by the business service end user, wherein each of the service providers' business services is configured to provide service-specific settings for one or more generalized services that are to be performed by the business façade service, the service-specific settings corresponding to the specified rules;
an act of the business façade service processing the received service request using one or more generalized services including at least one of a metering component, a security component and an error-checking component, such that system functionality is performed by the business façade service, wherein the service request is configured for service-specific processing provided by at least one identified, registered available service determined to be configured to provide the type of functionality requested by the client, wherein the identified service specifies one or more specific settings indicating how at least one of the generalized services provided by the business façade service is to be performed;

an act of the business façade service determining that the same service request was previously processed by the business-specific service and that the results of the processed request were cached at the business façade service, the cached results including includes both the determined service provider's service as well as the one or more indicated generalized services provided by the intermediary service provider according to the settings specified by the business-specific service for that generalized service;

an act of the business façade service sending the cached process request results to the business service end user, such that the registered service does not receive the end user's service request.

* * * * *